Jan. 13, 1942.  W. C. REHM  2,269,480
COMBINED COOKING UNIT
Filed Dec. 6, 1939
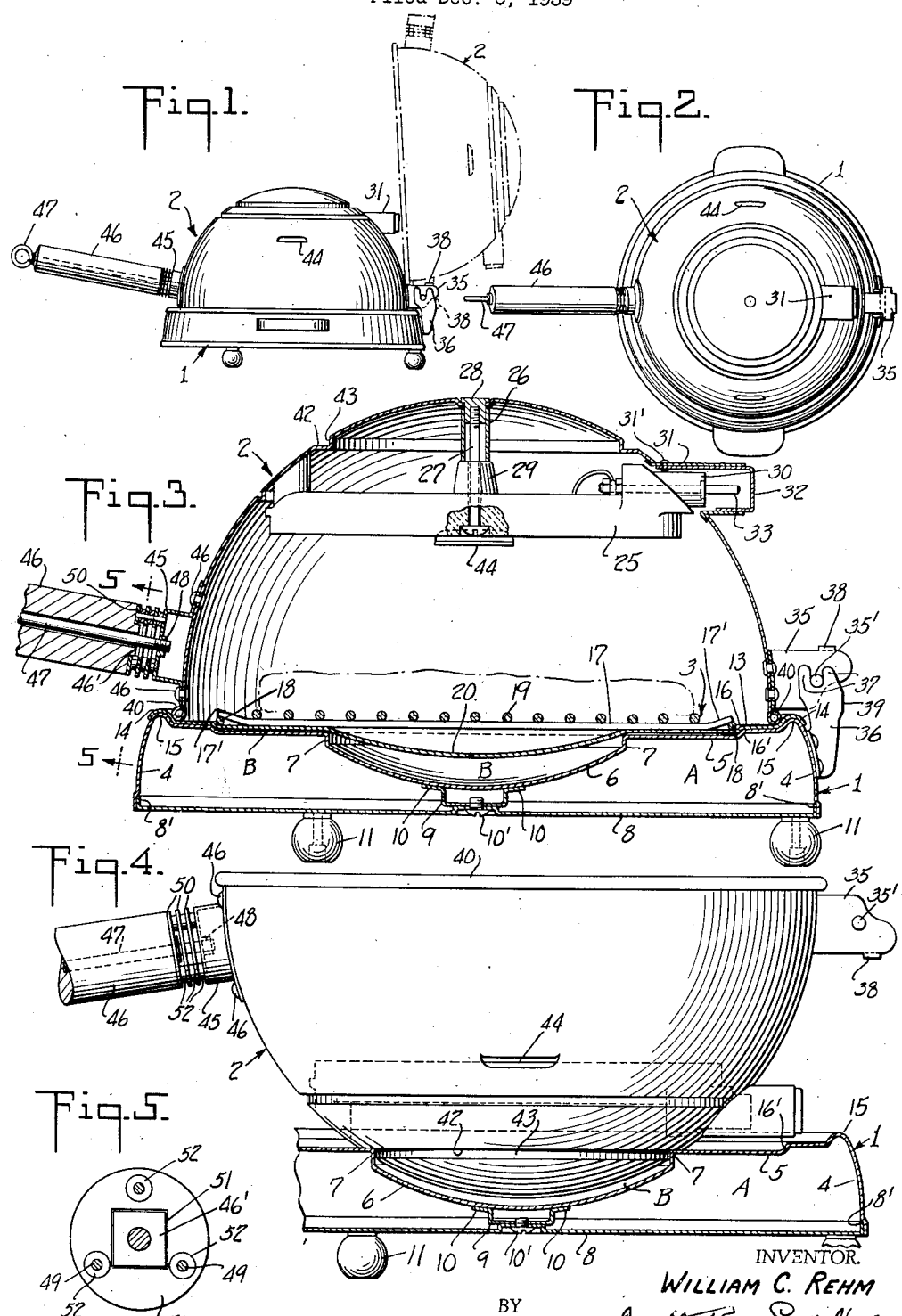
INVENTOR.
WILLIAM C. REHM
BY
ATTORNEYS Patented Jan. 13, 1942

2,269,480

UNITED STATES PATENT OFFICE 2,269,480

COMBINED COOKING UNIT

William C. Rehm, Meriden, Conn., assignor, by mesne assignments, to Manning, Bowman & Co., Meriden, Conn., a corporation of Delaware Application December 6, 1939, Serial No. 307,749

9 Claims. (Cl. 53—5)

This invention relates to cooking utensils and particularly to a unit which may be used for the roasting, broiling, frying and other cooking operations.

One object of the invention is a novel and improved combined cooking unit for the above indicated purposes which is characterized by the ease and facility with which the various cooking operations may be performed.

A further object of the invention is such a unit which is characterized by the safety in operation against burning the user and the table or other support upon which it is supported.

A further object of the invention is such a utensil which is characterized by its simplicity in construction and assembly and its low cost in production.

Further objects of the invention will hereinafter appear.

For a better understanding of the invention reference may be had to the accompanying drawing forming a part of this application, wherein:

Fig. 1 is a side view of a unit embodying the invention and showing one use thereof;

Fig. 2 is a plan view thereof;

Fig. 3 is a sectional view on an enlarged scale thereof;

Fig. 4 is a side view of the unit partly in section indicating another use thereof; and Fig. 5 is a sectional view along the line 5—5 of Fig. 3.

Referring to the drawing the invention is illustrated as embodied in a unit comprising a base 1, an invertible upper member 2 in the form of a dome-like shell and a grid and broiler rack 3. The base consists of a casing enclosing a dead air space A and formed of a top plate 5 having an annular depending peripheral edge or skirt 4 to which is attached in any suitable manner a lower baffle plate 8, and in the particular embodiment shown the baffle plate 8 is provided with a peripheral flange 8' fitting into the peripheral edge of the skirt 4. The top plate 5 has a centrally dished-out part 6 with a shoulder 7 formed at the periphery thereof for a purpose hereinafter described. The top plate 5 carries centrally thereof a supporting and reinforcing arch 9 of thin sheet metal, this arch being fastened to the top plate 5 at the dished-out part 6 in any suitable manner, as, for example, by spot welding the feet 10 formed on the arch to the top plate, the lower portion being fastened to the baffle by a screw 10'. This arch forms a supporting brace between the top plate 5 and the baffle 8 and a means of assembly of the baffle. The base is provided with any suitable supporting feet 11 preferably of insulating material which are fastened to the baffle 8. The baffle 8 and feet 11 thus form the support for the unit and in the preferred form the baffle plate 8 is of imperforate sheet form.

The grid and rack 3 assembly embodies a grid plate 13 which is supported upon the plate 5 of the base. This grid plate 13 is provided with a curved peripheral edge 14 corresponding to a similar annular curved seat 15 formed at the juncture of the plate 5 with the skirt 4 with which it mates to hold the grid plate 13 firmly upon the member 5 of the base. The grid plate member 13 is provided inwardly of its periphery with an annular shoulder 16 for the purpose of centering a grid or perforated plate member resting thereon, this grid member resting flat upon the grid plate 13 and in the particular embodiment shown being a wire rack. This rack comprises a peripheral rim of wire 18 to which the ends of closely spaced parallel wires 19 are secured and to which also the offset ends 17' of a crosswise reinforcing wire 17 are secured, the wires 19 in turn being secured to the cross wire 17 at each of their mid-points, the whole wire assembly being disposed so that its peripheral rim 18 is adjacent to the shoulder 16 formed in the grid plate. A dot and dash line indicates a steak or the like resting upon this wire rack. The grid plate 13 is provided centrally thereof with a pan or dished out part 20 for catching the drippings. The plate 5 is provided with a shoulder 16' corresponding to the shoulder 16 and these shoulders assist in the centering of the grid plate 13 while the plate 5 is dropped down inwardly of the shoulders 16, 16' to form an air chamber B between the plates 5 and 13.

The invertible dome-shaped member 2 is provided with an electric heater unit 25 mounted therein in any suitable manner. In the particular embodiment shown this heater unit is spaced centrally from the dome member by a spacer tube 26 and a screw bolt 27 passes through an opening formed in the heater and is screwthreadedly attached to a holding nut 28 which is inserted through an opening formed centrally of the member 2 and into the spacer tube 26. This tube engages a projection 29 formed with or fastened to the heater unit 25. The electric heater 25 is provided with an electric plug 30 connection which projects out through an opening in the side of the shell and is protected by a hood 31 suitably fastened to the shell. A heating element of conventional coiled resistance wire form (omitted for convenience in illustration) is secured within the labyrinth of the unit 25, and is of two sections with one end of each section terminating in a terminal pin 33 and the other ends joined and secured to a third pin 33 so as to provide "high" and "low" heats depending upon which pair of terminal pins 33 the plug engages, the plug being omitted for convenience in illustration. A U-shaped swinging arm 32 hinged at 31' to the hood 31 protects the user against accidental contact with the free but energized terminal pin, this arm being disposed within the hood and shiftable over laterally to protect the exposed pin when the plug is in. The shell is provided with a hinge bracket 35 which co-operates with a hinge bracket 36 fastened to the side of the base, the bracket 35 carrying pins 35' which are supported in the open fork-like socket bearings 37 formed in the bracket 36, and the bracket 35 carries a hinge stop member 38 which engages the bearing surface 39 formed on the side of the bracket 36 to hold the shell in the vertical position as indicated in dot and dash lines Fig. 1.

The upper member 2 is provided with a beaded edge 40 and the dimensions of the parts are such that the beaded edge in the position shown in Figs. 1 to 3 rests upon the grid plate 13 at the inner edge of the curved rim 14 and the upper member is thereby held and centered in position independently of the bracket 35, 36, although the bracket also performs some holding function.

The member 2 may be inverted from the position shown in Figs. 1 to 3 and supported upon the base 1 as indicated in Fig. 4 to function as an ordinary cooker or heater for various cooking and heating purposes. For this purpose the dome-shaped member 2 is provided with an annular seat 42 with a corresponding retaining shoulder 43 for resting upon the shoulder 7 formed in the base member around the periphery of the dished-out part 6 as shown in Fig. 4. In this position the grid plate and the rack assembly 3 is wholly removed from the unit. The shell is also provided with suitable ventilation openings 44 on opposite sides thereof.

The dome member 2 is provided with a handle bracket 45, this bracket being in the form of a cup-shaped member with peripheral rims riveted at 46 to the side of the dome member adjacent its peripheral edge and on the diametrically opposite side from the bracket 35. A handle 46 made of wood or any suitable material is fastened to the bracket 45 by means of a tightening bolt 47, the latter extending through an opening formed longitudinally of the handle and screw-threadedly engaging an opening formed in the bracket 45 at 48. The handle 46 is insulated from the bracket 45 by insulating bushings 52 carried by pins 49 which are disposed between the spacer discs 50, there being three discs in the particular embodiment shown. The outermost disc 50 is provided with a square hole 51 for the reception of the squared end projection 46' of the handle 46, and, if desired, the other discs 50 may be similarly provided with square openings. This enables tightening of the handle by simply turning of the bolt 47 without a corresponding turning of the handle 46. Thus the user may tighten the handle at any time without difficulty.

The dome-like shell member 2 may be reversed in position at any time for use either as a broiler or the like as shown in Figs. 1 to 3 or as an ordinary cooker or heater as shown in Fig. 4. This may be effected by simply lifting and inverting the upper member of the unit and replacing or removing the grid plate and the rack. Since the upper member is curved and dome-shaped at all parts thereof it cannot be inverted as in Fig. 4 and supported stably upon any plane surface as, for example, a table which would be burned thereby. It can only be supported stably by supporting it upon the shoulder 7 of the base forming a seat for the corresponding seat 42 of the shell. Accordingly, this unit may be used with proof against accidental resting of unintentional support of the heat unit carrying part of the device upon a table or the like. Also in operation either as a broiler or as an ordinary cooker the utensil may be safely supported upon any table without danger of burning or scorching of the same. This is due, among other things, to insulation against the transfer of heat by the dead air chambers A and B, to the reinforcing arch of thin sheet metal which is also effective in insulating against the transfer of any heat from the plate member 5 and 6 to the baffle plate 8, to the large heat radiating surface formed by the base member 1 and also to the insulating feet 11.

I claim:

1. In a cooking unit of the character set forth, an invertible dome-like member carrying therein an electrical heating unit and having formed around the curved surface thereof a seating ring and a base provided with seating means for a grid plate and rack assembly when used as a reflector cooker unit and a seating means corresponding to the seating ring formed in the dome-like member for supporting the same in an inverted position.

2. In a cooking unit of the character set forth, an invertible heater carrying unit of the reflector type, a base support member adapted to support said invertible member in either of its cooking positions, said invertible member having an externally curved surface and a seating ring formed in the curvature thereof and said base member having a corresponding supporting seat on its upper side.

3. In a cooking unit of the character set forth, a base member having an upper plate member provided with a downwardly depending peripheral skirt, a baffle member fitting onto the periphery of said skirt, said plate member having a centrally dished out part and a supporting shoulder or seat therearound, a thin sheet metal reinforcing arch member between said plate and said baffle, a grid plate and rack assembly supportable upon said upper plate member, and an invertible dome member carrying within the top thereof an electric heating unit, said dome member having a supporting seat formed therearound for support directly on the shoulder of said plate member when said dome member is inverted.

4. In a cooking unit of the character set forth in claim 1 wherein the dome-like invertible member and the base member are provided with hinge members which are readily separable by lifting the dome-like member from the base together with means for supporting the dome-like member out of heating relation with the grid plate and rack assembly.

5. In a cooking unit of the character set forth in claim 3 wherein the upper plate of the base and the grid plate are provided with peripheral curved mating portions for centering the grid and rack assembly and the dome member.

6. In a cooking unit of the character set forth in claim 3 wherein the upper plate of the base and the grid plate are provided with peripheral curved mating portions for centering the grid and rack assembly and the dome member and said grid plate is provided with means for centering the rack and said plate member forms with said grid plate an air chamber at the dished out part thereof and beyond the peripheral edges thereof.

7. In a cooker of the character set forth, a supporting base and an invertible heater carrying member supported by said base, said base comprising a baffle member and an upper plate member and a reinforcing arch member of thin metal fastened to the upper plate member and said baffle member at their central portions.

8. In a cooking unit of the character set forth in claim 1 wherein the base and the rim of the dome-like member carry co-operating hinged brackets, whereby the invertible member may be lifted from the base and supported in a substantially vertical position on said brackets when operating as a reflector type cooker and whereby the invertible member may be lifted to disengage the brackets and be supported upon the base in the inverted position, with the bracket members in vertically spaced relation.

9. A cooker unit of the character set forth comprising a broiler rack formed of a plurality of spaced cross wires fastened at their ends to a circular wire forming the rim of the rack and a reinforcing cross wire fastened to said parallel wires at points intermediate their ends and fastened to the wire ring which forms the rim at its ends with the ends offset to bring the main body of the cross wire in the plane of the rim wire.

WILLIAM C. REHM.